Nov. 15, 1932.   A. HOILAND ET AL   1,888,038
WINDSHIELD SCREEN
Filed Nov. 30, 1928
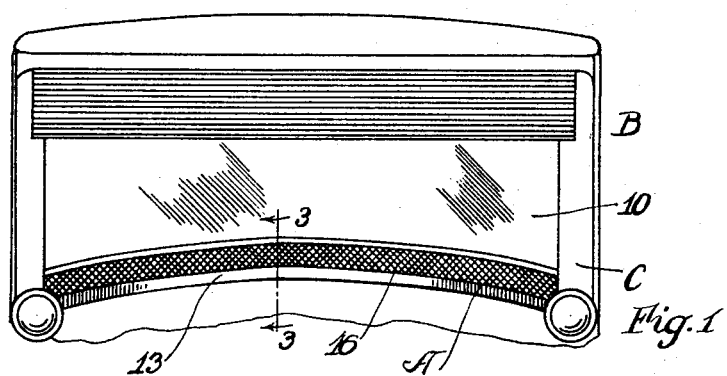
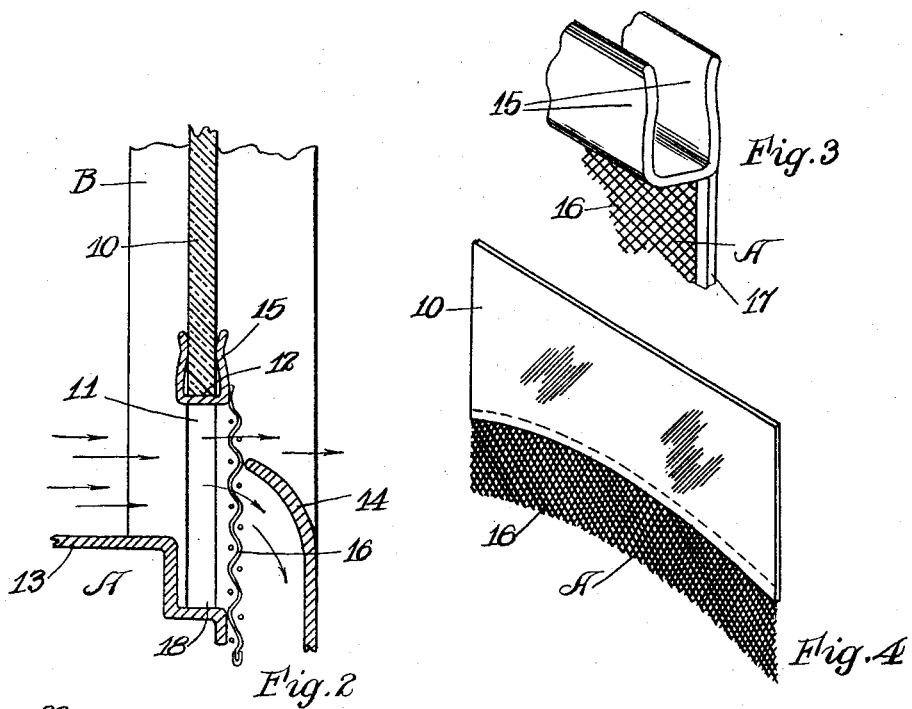
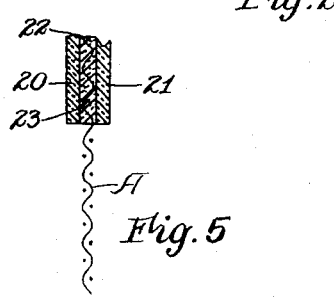
Inventor
Albert Hoiland
Patrick V. Moher
By
Attorney Patented Nov. 15, 1932

1,888,038

UNITED STATES PATENT OFFICE

ALBERT HOILAND AND PATRICK V. MOHER, OF FARGO, NORTH DAKOTA

WINDSHIELD SCREEN

Application filed November 30, 1928. Serial No. 322,861.

Our invention relates to a screen, particularly adapted to be used for the windshields of automobiles, and especially those of the closed type which have a vertical slideable windshield.

It is the object of our invention to provide a screen which is out of sight when not in use and is automatically in place when the windshield is raised to allow ventilation without any additional labor or inconvenience. In this device, I provide an accessory with which it is possible to leave the windshield open, even when passing through localities infested with mosquitoes, flies, bees or other insects.

A further object of our invention is to provide a means to break the force of the wind entering through the open windshield of a car and lessen its force. This is an advantage in warm weather when it is desirable to have good ventilation without the undesirable force of the strong wind.

It is a feature of our invention to have the screen in sight only when it is in use, thus not materially detracting from the appearance of the car, nor will it hinder the operation of the windshield itself, being attached as an integral part of the windshield.

The detailed construction of the invention and the advantages thereof will be more fully explained in connection with the accompanying drawing illustrating one embodiment thereof.

Figure 1 is a front view of my screen in place on the windshield of an automobile.

Figure 2 is a cross section on the line 3—3 of Figure 1.

Figure 3 is a perspective detailed view of a portion of my screen.

Figure 4 is an alternate form of construction showing the screen embedded in the glass.

Figure 5 is a section through the lower edge of the windshield illustrated in Figure 4.

With particular reference to the drawing, our screen A is adapted to be attached to the windshield glass 10 of a car B. In Figure 1, we have illustrated my screen A in place when the windshield glass 10 has been raised to admit air for ventilation through the front of the car. The construction is shown in detail in Figure 2. The windshield glass 10 raises in the grooves 11 to allow the air to enter between the bottom edge 12 of the windshield glass 10 and the upper edge 13 of the windshield frame C of the automobile B. The particular form of body construction shown in the drawing permits a portion of the air to be deflected downward by the inside deflector plate 14, in order to force the cool air to circulate near the floor of the car, which being near the motor of the vehicle is apt to become uncomfortably warm. This is a common construction used especially on Fisher type VV bodies used on a large number of automobiles.

Along the bottom edge 12 of the windshield 10, we provide a U-shaped clamp 15 to which is attached the screen A. This clamp 15 may be made with spring sides to hold the clamp firmly onto the glass, or it may be cemented permanently to the lower edge of the glass as is desired. The screen portion 16 may be fitted with a light frame 17 of metal or other suitable material to keep the screen rigid and in place. This screen 16 and frame 17 may be attached to the side of the clamp 15 as shown in Figure 2 to enable the windshield to have a wider seat 18 when in a closed position and to make a tight joint.

An alternate construction of the screen is shown in Figure 4. In this view the screen is shown embedded directly in the glass, as may be very easily done if the windshield glass is built up of thin layers of glass with celluloid in the center, as is being done in some cases. This type of screen is shown without a frame 15, the screen being of sufficient stiffness to render the use of a frame unnecessary.

The operation of the invention is very simple. As the screen is attached directly to the glass, raising the windshield glass will also raise the screen to extend over the open area in the windshield, thus enabling the interior of the car to be ventilated without the possibility of insects entering the car. As this type of windshield ordinarily only raises but a short distance, the screen is at no time high enough to impair the vision of any person within the automobile.

In the windshield 10 illustrated in Figure 4, where the body of the windshield is made up of several layers of glass, such as 20 and 21 with a celluloid or similar filler such as 22 between the two panes of glass 20 and 21, the screen A is adapted to be embedded at 23 in the filler 22. This form of windshield is commonly known as the shatterless glass type.

The window 10 of the automobile or vehicle may be the windshield window or any other window of the automobile or vehicle and may be constructed so that the layers of glass 20 and 21 cover the filler 22 as in the glass known as shatter-proof glass for motor vehicles. This filler 22 may have a short anchoring portion embedded as at 23 of screen or other material anchored in the filler 22 between the glass sides 20 and 21. To this anchoring portion embedded in the filler 22, the screen A may be secured in any suitable manner.

The invention thus described contains references to a certain construction of car and specific form of windshield. It is understood that the size and shape would have to conform with the windshield constructions on the various makes of cars. For example, the windshield glass on some cars has a straight lower edge 12, rather than the rounded edge as has been shown in the drawing.

In accordance with the patent statutes, we have described the principles of operation of my windshield screen and while we have illustrated a particular formation and construction of the same, we desire to have it understood that the illustrations are merely suggestive of a means of carrying out our invention and that other formations and designs may be employed within the scope of the following claims without departing from the spirit of the invention.

We claim:

1. A windshield including, a vision pane adapted to be raised up and down to open and close the same, and a wire screen having one edge integrally connected at all times along the lower edge of the vision pane to provide a screened opening along the lower edge of the windshield when it is open.

2. A windshield for motor vehicles including, a transparent body portion made up of several layers of transparent material, and a screen for closing the open portion of the windshield when the shield is raised for ventilation having an edge embedded between the layers of said windshield.

3. A windshield for a motor vehicle including, a slidable transparent window pane, said window pane being made up of several layers of material, and a screen projecting from the side of said windshield having its edge embedded between the layers of the same.

4. A windshield for a motor vehicle including, a transparent shield member slidably positioned to raise and lower the same, and a screen having an edge secured integrally to the lower edge of said shield adapted to screen the opening when the shield is raised.

5. A windshield slidable up and down in a frame in a motor vehicle, and a screen carried by the lower edge of the same, the attaching edge of said screen being embedded between the sides of the transparent shield along one edge thereof.

6. A window for a motor vehicle including, a transparent body portion made up of several layers of transparent material, and a screen anchor having the edge thereof embedded between the layers of said transparent body portion along an edge of the body portion.

7. A window for a motor vehicle including, a transparent body made up of several layers of transparent material, an inner transparent material between the outer layers having a nature to receive a screen-like member therebetween to anchor the same therein between the outer sides of an edge of said body portion.

8. A window for a motor vehicle including, a body portion made up of several layers of transparent material, the outer layers on either side being formed of glass, the inner layer having a nature softer than glass, and a member anchored in said inner member between said outer sides of glass adapted to project from the edge of the window.

9. A shatter-proof window including, a body made of several layers of transparent material, and a member adapted to support a screen marginally anchored in one edge of said window and projecting from the edge thereof.

ALBERT HOILAND.
PATRICK V. MOHER.